(No Model.)

L. COTÉ.
MACHINE FOR MEASURING SURFACES HAVING IRREGULAR OUTLINES.

No. 245,059. Patented Aug. 2, 1881.

Witnesses.
James H. Williams
Chas. F. Munroe

Inventor:
Louis Coté
per Stephen Moore
Attorney

UNITED STATES PATENT OFFICE.

LOUIS COTÉ, OF ST. HYACINTHE, QUEBEC, CANADA.

MACHINE FOR MEASURING SURFACES HAVING IRREGULAR OUTLINES.

SPECIFICATION forming part of Letters Patent No. 245,059, dated August 2, 1881.

Application filed February 28, 1881. (No model.) Patented in Canada October 23, 1878.

*To all whom it may concern:*

Be it known that I, LOUIS COTÉ, of St. Hyacinthe, in the Province of Quebec and Dominion of Canada, have invented a new and useful Improvement in Machines for Measuring Surfaces Having Irregular Outlines, (for which I have obtained a patent in the Dominion of Canada, No. 9,286, bearing date October 23, 1878,) of which the following is a specification.

My invention relates to machines for measuring skins, sides of leather, or other articles having irregular outlines, and indicating and registering the superficial area of the same in square feet and fractional parts thereof; and the object of my invention is to provide a cheap, convenient, and portable instrument, which may indicate with sufficient accuracy the measurement required, and be free from the objections to which the more expensive and cumbersome machines are subject.

My invention consists in the combination, with a rotary wheel adapted to be rolled across the surface to be measured upon equidistant parallel lines, of an index-finger and scale graduated to represent square feet and fractional parts thereof, such finger being moved along the scale by the revolution of the said wheel, as hereinafter set forth; and, further, in the combination, with such an instrument, of a table adapted to receive the article to be measured and divided by parallel and equidistant lines into sections of such a width that when the wheel above mentioned is rolled across the article to be measured upon each of these lines the index-finger will indicate upon the graduated scale the correct measurement thereof.

Figure 1:
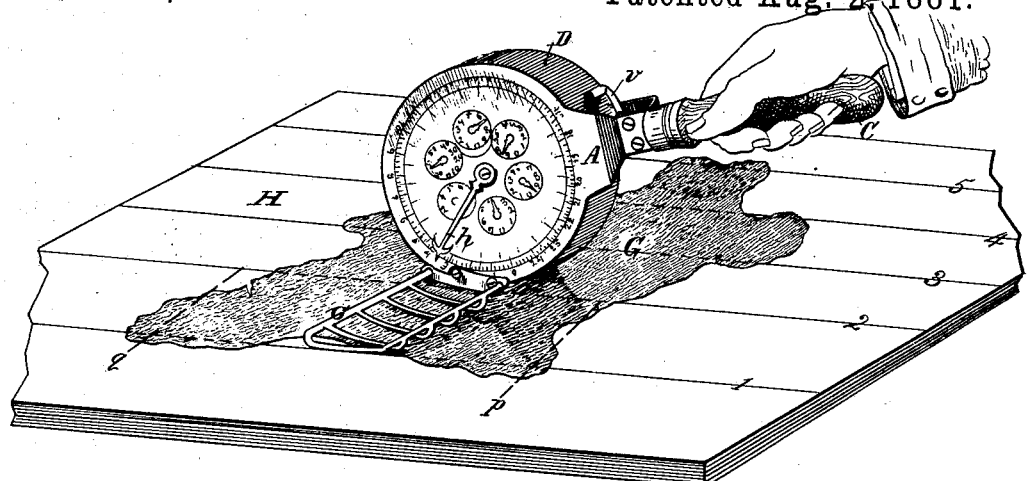
Figure 2:
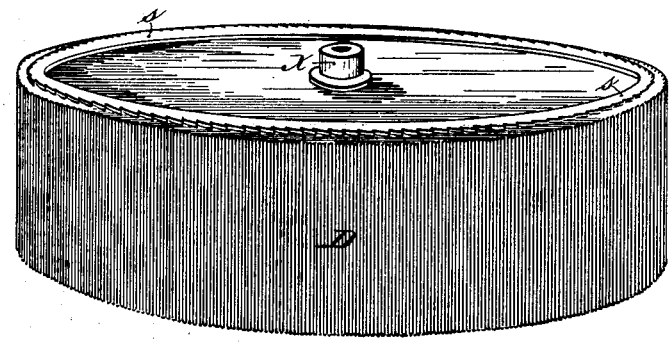
Figure 3:
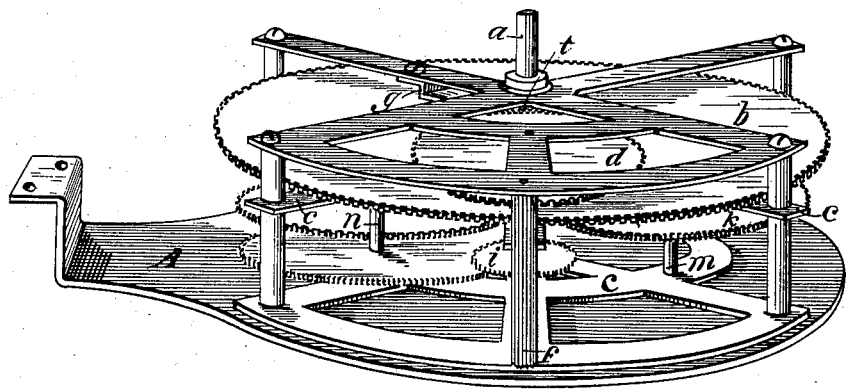

In the accompanying drawings, in which similar letters of reference indicate similar parts in all the figures, Figure 1 is a perspective of the machine as used upon a skin or side of leather; Fig. 2, a view of the wheel D separated from the other parts, and Fig. 3 a view of the interior mechanism with the outside wheel removed.

A represents a plate of metal, upon which is drawn or engraved a circumferential scale, and also a series of small dial-faces, similar to the well-known gas-register. This plate is firmly fastened to a skeleton-frame, *c c c*, adapted to support the gearing which operates the several index-fingers, and has a projecting portion by which it is fastened to the handle C.

D is a wheel which forms a revolving case about the frame *c c c* and gearing, and also covers the side of the same opposite to that covered by the dial-plate A. This wheel D is attached by its hub *x* to the shaft *a*, Fig. 3, and when revolved turns with it the shaft and the train of gearing connected thereto, thereby moving the index-fingers upon the dial-plate A. The shaft *a* does not extend through to the opposite side of the frame *c c c*, but terminates above the large wheel *b*, its lower end being supported in a bracket, *g*.

Upon the shaft *a* is a pinion, *t*, which meshes into the wheel *d*, which, in turn, engages with the small pinion *f*, which drives the large wheel *b*. This wheel *b* is attached to a shaft which extends through the center of the plate A and carries the large index-finger *h*, Fig. 1. These several connecting-gears may be so sized, and the large dial so graduated, that one revolution of the wheel D will move the index-finger *h* over a space upon the scale representing one square foot. The long pinion *f* also meshes into a wheel, *i*, which, in turn, engages with an "idler" (not seen,) which drives the wheel *k*, the shaft *m* of which, extending through the dial-plate A, carries one of the small index-fingers of the series shown in Fig. 1. These connecting-gears may be so sized that the said index upon the shaft *m* shall make one revolution for each revolution of the wheel D, and thus indicate one square foot of area by a complete revolution, and by properly graduating the dial-plate over which the said index plays fractional parts of a square foot may be indicated. Another pinion upon the shaft *m* (carrying this first-mentioned small index-finger) meshes into a gear of ten times its size upon the shaft of the next succeeding dial, and upon this is a pinion meshing into one of ten times its size upon the shaft of the next dial, and so on to the last of the series, each index in the series moving one-tenth as fast as the next preceding one, this arrangement being similar to the well-known gas-register.

A bracket, *o*, Fig. 1, projects from one side of the plate A, at right angles to the same, as shown. This projects a distance that, multiplied by the circumference of the wheel D, will equal one foot, and indicates the distance apart of the parallel lines, along which the instrument should be rolled in measuring a skin or other object. For instance, the roll D may be eighteen inches in circumference and the bracket o eight inches long, or the lines upon the table hereinafter described the same distance apart—then it is evident that in rolling the instrument a distance equal to the circumference of the roll the bracket will have swept over an area of one square foot, and with the gears sized as above proposed the index-fingers will indicate the same both on the large dial and the small ones.

In operating the machine the article to be measured may be marked by parallel and equidistant lines into sections, or, preferably, may be spread upon a table, H, having parallel lines running across it at a distance apart equal to the length of the bracket o. One end of the skin or article to be measured may be laid as near one of the parallel lines as its contour will allow; then the instrument, with the large index at zero on the scale, and the position of the index-fingers of the small dials being noted, is placed upon the skin in such a position that the edge of the bracket o is at the dotted line p, and rolled along the line 2 until the bracket o reaches the dotted line q, when it is lifted from the skin, and the bracket o placed similarly at the edge of the skin between lines 2 and 3, and the instrument rolled along line 3 in the same way, and so of each successive space until the entire surface has been passed over by the bracket o.

Upon the side of the wheel D is shown a ratchet, s, with which a pawl, v, engages to prevent any backward motion of the wheel.

The large index-finger h may be loosely attached to its shaft by a frictional fastening, or driven by a ratchet and pawl, so as to allow it to be turned back to zero, after the measurement of each skin, without revolving the wheel D. This is necessary only when it is desired to note the measurement of each skin individually, as the collective measurement of any number of skins may be ascertained by taking the difference in the indication of the small dials at the beginning and at the close of the operation.

I claim—

1. The combination of the wheel D, provided with mechanism for operating an index-finger along a graduated scale, with the bracket o, substantially as and for the purpose specified.

2. The combination of the wheel D, provided with mechanism for operating an index-finger along a graduated scale, and the bracket o, with a table adapted to receive the article to be measured, and having sections indicated thereon by parallel straight equidistant lines, substantially as and for the purpose set forth.

LOUIS COTÉ.

Witnesses:
J. HAULT,
A. M. MORIN.